Nov. 3, 1959 G. A. LYON 2,911,258
WHEEL COVER
Filed June 20, 1955 2 Sheets-Sheet 1

Inventor
George Albert Lyon

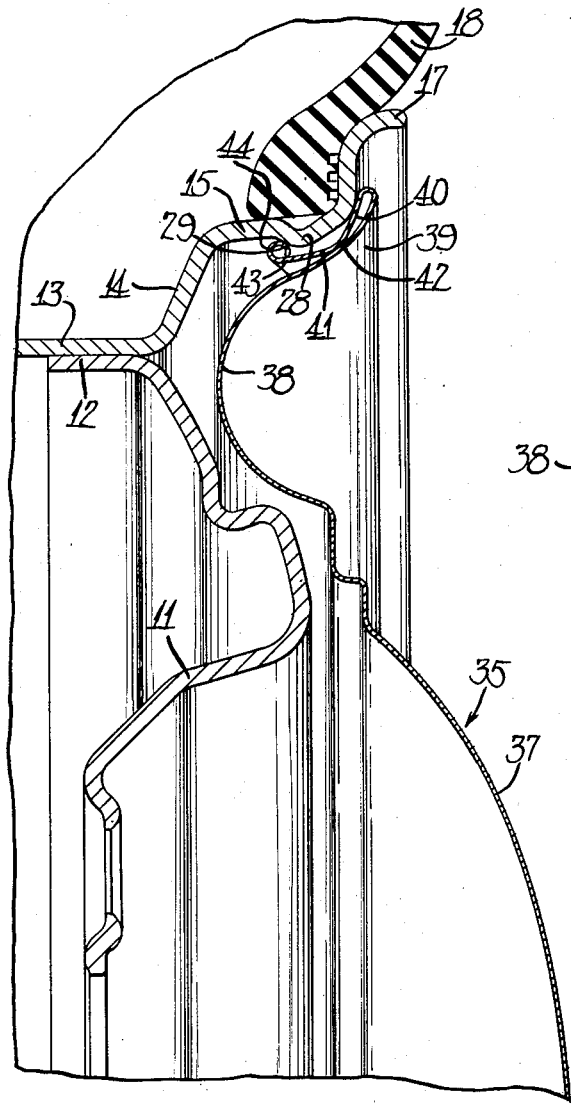
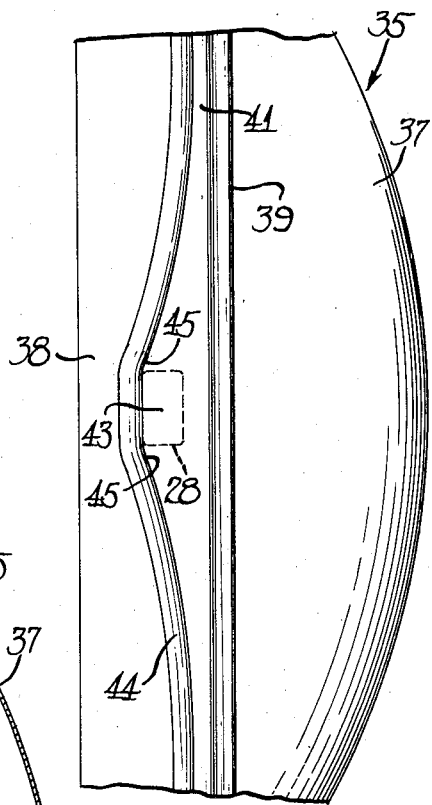

United States Patent Office 2,911,258
Patented Nov. 3, 1959

2,911,258

WHEEL COVER

George Albert Lyon, Detroit, Mich.

Application June 20, 1955, Serial No. 516,537

4 Claims. (Cl. 301—37)

The present invention relates to improvements in wheel structures and more particularly concerns the ornamental and protective covering of the outer sides of vehicle wheels.

An important object of the present invention is to provide an improved wheel structure having a novel cooperation of a wheel cover with a wheel part for snap-on, pry-off retention of the cover.

Another object of the invention is to provide improved means on a wheel cover for snap-on, pry-off retention thereof on the outer side of a vehicle wheel.

A further object of the invention is to provide an improved, simple wheel cover construction having novel self-retaining means thereon for interengagement with retaining bumps on a tire rim.

Other objects, features and advantages of the present invention will be readily apparent from the following detailed description of certain preferred embodiments thereof taken in conjunction with the accompanying drawings in which:

Figure 5 is a radial sectional view taken through a wheel substantially the same as Figure 2 but showing a slight modification in the retaining means of the cover; and Figure 6 is a side elevational view of the cover of Figure 5.

Figure 2:
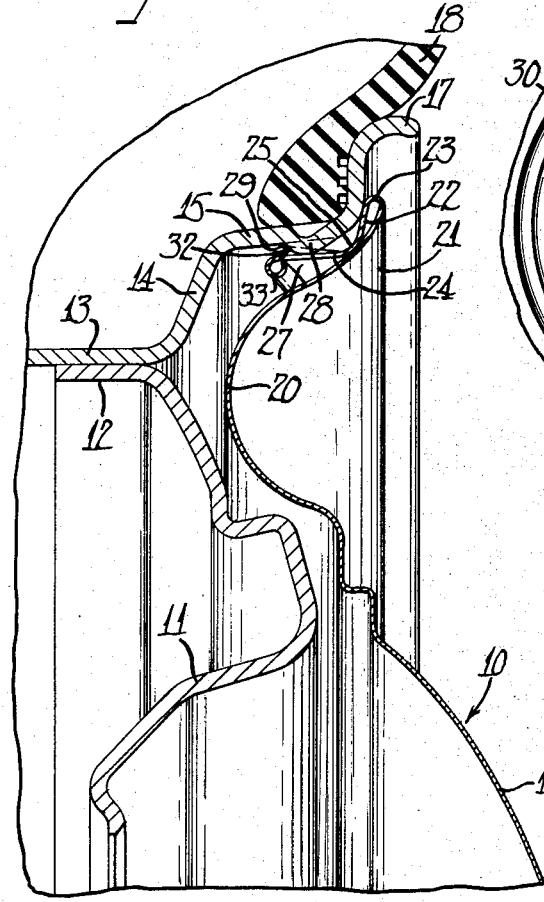
Figure 2 is an enlarged fragmentary radial sectional view taken substantially on the line II—II of Figure 1.
Figure 1:
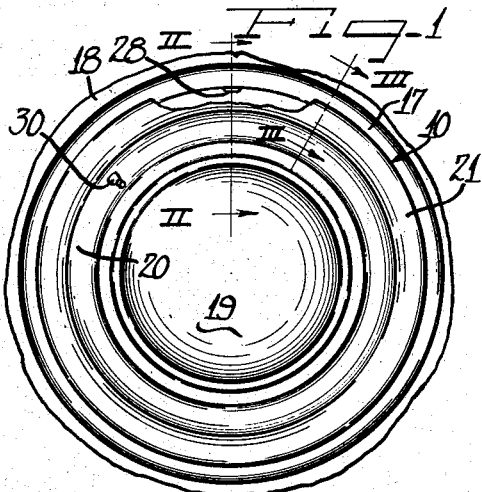
Figure 1 is a side elevational view, partially broken away, of a wheel structure showing features of the invention.
Figure 4:
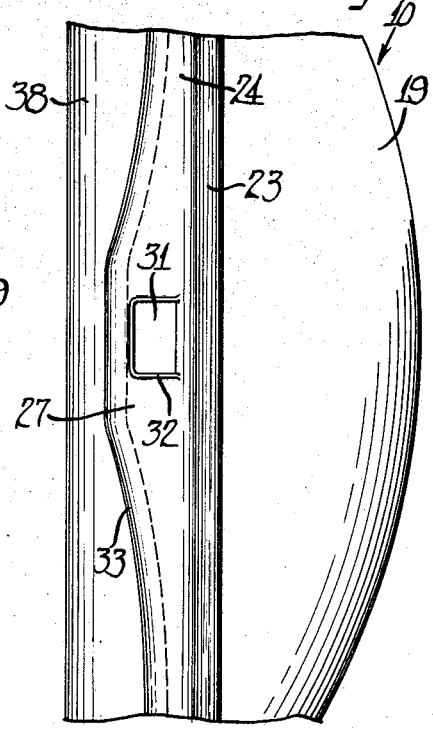
Figure 4 is a fragmentary side elevational view of the cover of Figure 2.
Figure 3:
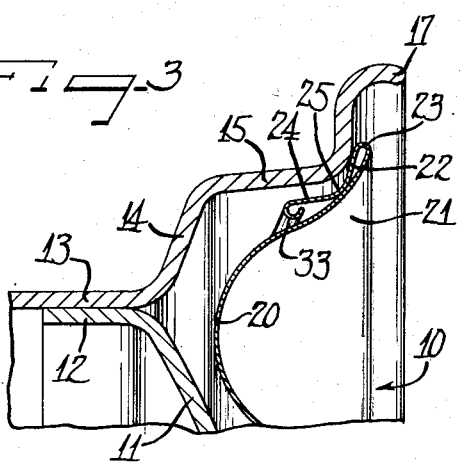
Figure 3 is a fragmentary radial sectional detail view taken substantially on the line III—III of Figure 1.

Having reference to Figures 1–4, a wheel cover 10 according to the present invention is adapted to be applied to the outer side of a vehicle wheel including a disk spider wheel body 11 having an outer marginal generally axially inwardly directed attachment flange 12 secured in suitable fashion to a base flange 13 of a tire rim having at the outer side thereof and extending from the base flange a side flange 14 which merges with a generally axially outwardly and radially sloping intermediate flange 15 extending to a generally radially outwardly and then axially outwardly extending terminal flange 17. The flanges of the tire rim are constructed and related to afford support for a pneumatic tire 18 which may be of the tubeless type or may be a tire and tube assembly.

By preference, the cover 10 comprises a one-piece sheet metal drawn plate or disk of suitable material such as stainless steel or brass or the like that may be readily drawn and shaped into form. Such material may be readily finished such as by polishing or burnishing and plating. Herein the cover includes a crown portion 19 leading to an annular inwardly dished portion 20 at the radially outer side of which is a marginal generally radially and axially outwardly extending portion 21 for overlying the tire rim.

For retaining the cover 10 on the wheel, an outer marginal underturned flange 22 is provided on the cover plate affording a reinforced outer edge beadlike turned smooth finishing rib 23 and extending radially inwardly beyond the inner diameter of the axially outer part of the intermediate flange 15. Extending generally axially inwardly at the inner end of the flange 22 is a flange extension portion 24 which diverges from the adjacent generally oblique outer annular portion of the cover body and joins the main radially extending portion 22 of the flange on a radius juncture 25 that at least in assembly with the wheel backs up against the back of the cover for affording resilient stiffness for the retaining flange.

At suitable intervals, such as four, corresponding to four corners of a blank from which the cover may be made, the axial flange extension 24 is provided with short, broad retaining finger extensions 27 which are retainingly engageable with retaining bumps 28 which are pressed into and project radially inwardly from the axially outer portion of the intermediate flange 15. Each of the bumps has an undercut generally radially and axially inwardly directed retaining shoulder 29.

For effective interengagement with the retaining bumps 28 for not only retaining the cover on the wheel but also for holding the cover against turning on the wheel so that shearing of a valve stem 30 projecting through the dished cover portion 20 is prevented, each of the retaining finger extensions 27 and the adjacent portion of the flange 24 is provided with a bump receiving aperture 31. Such aperture is defined at its axially inner and circumferential sides by a reinforcing and bump engaging radially outturned lip flange 32. The axially inner portion of the flange is engageable cammingly with the retaining shoulder 29 of the bump with which it is engaged in assembly with the wheel. The axial spacing of the edge defined by the axially inner portion of the lip flange 32 is such that it will enter into tensioned camming engagement with the bump shoulder 29 and thus draw the underturned flange 22 snugly against the terminal flange 17 and more particularly adjacent juncture thereof with the intermediate flange 15. The circumferential side portions of the flange 32 cooperate with the sides of the bump 28 to hold the cover against turning on the wheel.

In order to afford substantial resilient stiffness for the flange 24 and more particularly the finger extensions 27 thereof, the edge of the flange inclusive of the finger extensions 25 is reinforced, preferably entirely annularly thereabout by means such as a turned extremity 33 in the present instance comprising a turned bead which is curled generally radially inwardly and axially outwardly. Through this arrangement, radially inward deflectional forces against the finger extensions 27, as for example when the fingers are cammed over the retaining bumps 28 in applying the cover to the wheel, will be strongly resisted by the stiffening bead 33.

In applying the cover to the outer side of the wheel, it is generally centered with respect to the wheel and the valve stem 30 registered through a suitable opening in the cover portion 20. Then the cover is pressed axially inwardly so that the outturned and preferably generally radially and axially outwardly oblique axially inner lip flange portions 32 will cam inwardly along the slope of the outer surface of the retaining bumps 28 until the retaining flanges snap behind the retaining shoulders 29 of the bumps and draw the cover axially inwardly tight against the tire rim. In this assembled relationship the cover is held in spaced relation to the wheel body and will thus not be affected by any manufacturing tolerances in the axial disposition of the wheel body relative to the tire rim. Furthermore, in view of the high resilience afforded by the turned edge bead 33, the retaining fingers 27 are held under strong resilient tension radially outwardly in engagement with the retaining bumps and thus will strongly resist any accidental displacement forces against the cover such as may be imposed thereon by curbing or other extraneous forces or by weaving of the wheel in service.

For removing the cover from the wheel, a suitable pry-off tool such as a screwdriver or the like may be applied behind the outer reinforced margin of the cover and pry-off force applied thereto for withdrawing the retaining fingers 27 from the retaining bumps.

In the modification of Figures 5 and 6, the wheel itself may be of substantially the same structure as the wheel shown in Figure 2 and therefore similar reference numerals identify similar parts thereof. In this form of the invention a cover 35 having a central wheel body covering crown portion 37, and intermediate annular dished portion 38 and an outer generally radially and axially outwardly directed marginal tire rim covering portion 39 has an underturned marginal flange 40 provided with a continuous annular generally axially inwardly directed flange portion 41 joined thereto on a radius juncture 42 that shoulders against the back of the adjacent portion of the cover.

At suitable intervals the axially extending flange portion 41 is provided with short and broad finger extensions 43 which are located for cover retaining engagement with the retaining bumps 28. In this instance, the flange 41 and the retaining finger extensions 43 are provided with a continuous radially and axially outwardly turned terminal 44 in the form of a bead which affords substantial resilient stiffness therefor and also provides at the fingers 43 cover retaining terminals engageable cammingly and under resilient tension behind and against the retaining shoulders 29 of the retaining bumps. By having the retaining finger extensions 43 taper away from the inner ends of the fingers, substantially as shown in Figure 6, angular shoulders 45 are provided at respectively opposite sides of the bump shoulder engaging portions of the bead 44 and which angular shoulders generally oppose the sides of the engaged retaining bumps 28 and thus hold the cover against the tendency toward turning on the wheel responsive to torque forces in service. In Figure 6 the bump 28 is shown schematically in dash outline.

The cover 35 similarly as the cover 10 is applied to the outer side of the wheel by generally centering the same and aligning the retaining fingers 43 with the bumps 28 and pressing axially inwardly to snap the retaining finger portions of the bead 444 behind the retaining fingers into tensioned gripping engagement with the retaining bump shoulders 29. It will be appreciated that the continuous nature of the bead 44 causes the finger portions thereof to be drawn with substantial resilient tension against the retaining bumps. Removal of the cover 35 may be effected by inserting a pry-off tool behind the outer margin thereof and causing yielding of the retaining fingers to snap out of engagement with the retaining bumps.

With respect to the disclosure in Figures 5 and 6 of the present application, reference is made to my continuation-in-part application Serial No. 714,241, filed February 10, 1958, wherein this subject matter is claimed.

It will be understood that modifications and variations may be effected without departing from the scope of the novel concepts of the present invention.

I claim as my invention:

1. In a wheel structure including a wheel body and a tire rim having a flange provided with retaining bumps thereon, a cover for disposition at the outer side of the wheel including a marginal flange having retaining finger extensions and a continuous reinforcing resiliency imparting turned terminal structure on said flange and finger extensions and affording substantial resilient stiffness for the retaining fingers in engagement with the retaining bumps for holding the cover on the wheel, said turned terminal being turned generally radially inwardly to enable close approach to the rim flange of the opposing faces of the fingers, and the retaining finger extensions having openings therein for reception of the retaining bumps.

2. In a wheel structure including a wheel body and a tire rim having a flange provided with retaining bumps thereon, a cover for disposition at the outer side of the wheel including a marginal flange having retaining finger extensions and a continuous reinforcing resiliency imparting turned terminal structure on said finger extensions including the ends and sides thereof and affording substantial resilient stiffness for the retaining fingers in engagement with the retaining bumps for holding the cover on the wheel, said turned terminal structure being turned generally radially inwardly to enable close approach to the rim flange of the opposing faces of the fingers, and the retaining finger extensions having openings therein for reception of the retaining bumps, said openings being defined by reinforcing and bump engaging lip flange structure projecting generally radially outwardly.

3. In a wheel structure including a wheel body and a tire rim having a flange provided with retaining projections thereon, a cover for disposition at the outer side of the wheel including a marginal flange having retaining finger extensions and a continuous reinforcing resiliency imparting turned terminal structure on said flange and finger extensions and affording substantial resilient stiffness for the retaining fingers in engagement with the retaining bumps for holding the cover on the wheel, said turned terminal being turned generally radially inwardly and the retaining finger extensions having openings therein for reception of the retaining bumps, said openings being defined by reinforcing and bump engaging lip flange structure projecting generally radially outwardly, the axially inner portion of the lip flange projecting generally radially and axially outwardly for engagement with shoulders on the bumps.

4. In a cover for disposition at the outer side of a vehicle wheel, a cover plate having behind the outer margin thereof a generally axially extending continuous flange provided with finger extensions of substantial breadth but short in relation to the flange, said flange having a continuous turned terminal imparting substantial resilient stiffness thereto, said finger extensions having openings therein for reception of retaining projections on a wheel part.

References Cited in the file of this patent

UNITED STATES PATENTS

| | | |
|---|---|---|
| 2,561,160 | Weasler | July 17, 1951 |
| 2,607,633 | Lyon | Aug. 19, 1952 |
| 2,624,635 | Lyon | Jan. 6, 1953 |
| 2,624,640 | Lyon | Jan. 6, 1953 |
| 2,669,487 | Horn | Feb. 16, 1954 |
| 2,671,695 | Lyon | Mar. 9, 1954 |